Oct. 2, 1956     F. J. GARDINER     2,764,810
PROCESS FOR MAKING A RECTANGULARIZED TELEVISION TUBE BODY
Original Filed June 9, 1950     7 Sheets-Sheet 1
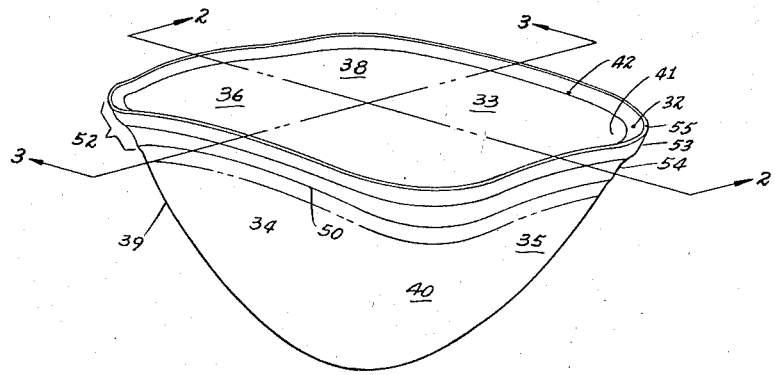
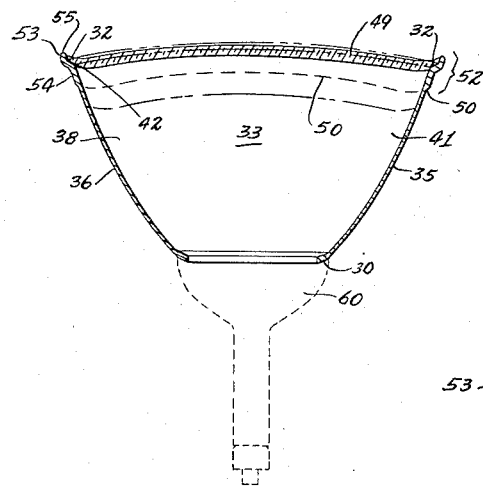
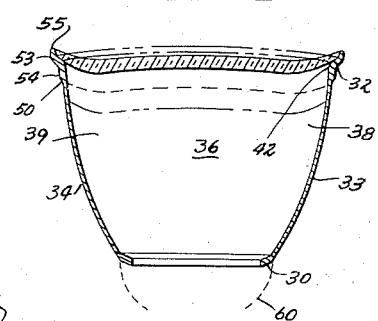
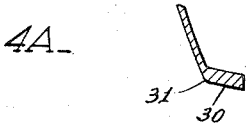
INVENTOR.
FRANK JOHN GARDINER
BY
Ostrolenk and Faber
ATTORNEYS INVENTOR.
FRANK JOHN GARDINER
BY Ostrolenk and Faber
ATTORNEYS INVENTOR.
FRANK JOHN GARDINER
BY Ostrolenk, Faber,
Gerb & Soffen
ATTORNEYS Oct. 2, 1956  F. J. GARDINER  2,764,810
PROCESS FOR MAKING A RECTANGULARIZED TELEVISION TUBE BODY
Original Filed June 9, 1950  7 Sheets-Sheet 5

INVENTOR.
FRANK JOHN GARDINER
BY Ostrolenk, Faber,
Gerb & Soffen
ATTORNEYS

INVENTOR.
FRANK JOHN GARDINER

BY Ostrolenk and Faber

ATTORNEYS

United States Patent Office 2,764,810
Patented Oct. 2, 1956

2,764,810

PROCESS FOR MAKING A RECTANGULARIZED TELEVISION TUBE BODY

Frank John Gardiner, Berwyn, Pa., assignor to I-T-E Circuit Breaker Company, Philadelphia, Pa., a corporation of Pennsylvania Original application June 9, 1950, Serial No. 167,189. Divided and this application September 16, 1950, Serial No. 185,300

4 Claims. (Cl. 29—534)

The present invention is a division of application Serial No. 167,189, filed June 9, 1950, and relates to television tubes and more particularly to rectangular television tubes wherein the main body of the tube is formed of a rectangularized frustro-conical metal member with appropriate seating areas or flanges at each end to provide, respectively, a seating and supporting surface for the glass face of the tube and a supporting and seating surface at the opposite end for the member which carries the electron beam source.

Heretofore in the manufacture and operation of television sets with metal wall viewing tubes, a circular image surface has been used. An inscribed rectangle has been scanned with the electron beam and the balance of the circular image surface was masked from views. The standard broadcast television image is substantially rectangular, having a height equivalent to .75 of its length and having sharp corners. The use of the rectangular picture on the circular image surface thus resulted in the non-utilization of approximately 23 per cent of the total image area. Thus, although this 23 per cent of the image area could have no utility whatever with respect to the bringing into view of the full rectangular picture which was transmitted, it was still necessary to manufacture and form this waste area to the same standards of quality as the useful 77 per cent of the image area. In addition, this unused but heretofore apparently waste area occupied a sizeable volume requiring additional cabinet space and materials. Masking was provided in the cabinet which had no utility other than to obscure the unused portions of the tube.

Modern technique is demonstrated by Patent No. 2,603,177, issued July 15, 1952, comprising the formation of a reinforced conical metallic body which provides for a circular viewing surface and by Patent No. 2,254,090. These techniques have proved to be inexpensive and highly efficient.

In order to make these techniques available to a rectangularized television tube, it is first necessary to make the fundamental conical tube. The initial fundamental conical tube must be so arranged that by a simple operation it may be reshaped into the desired rectangularized form wherein the seating surface for the viewing screen is rectangularized while the opposite seating surface for the electron gun envelope remains circular.

A fundamental object of the present invention, therefore, is the formation of a rectangularized metallic television tube body.

A further and important object of the present invention is the formation of such a rectangularized metallic tube body so that the seat for the viewing surface is substantially rectangularized while the seat for the electron gun envelope at the other end remains substantially circular.

A still further and equally important object of the present invention is the provision of reinforcing areas at the seating surfaces for both the viewing screen and the electron gun envelope.

Another object of the present invention is the provision of such reinforcement without the necessity for providing excess metal in the wall of the tube body.

Still another object of the present invention is the arrangement of a rectangularized cone and the technique for the manufacture thereof so that the final rectangularized cone body may be formed from a cone which is initially, and before its subjection to rectangularization, provided with the necessary reinforcing areas.

Thus, in the process of making the novel rectangularized television tube body a true frustro-conical shape is first formed with the necessary flanges for reinforcing areas at opposite ends, an appropriate seat being provided for the screen and an appropriate seat being provided for the electron gun. This initial cone is, however, so formed that when it is reformed to the desired rectangularized shape for the seating surface of the viewing screen, the inner boundary of this latter seating surface extends in the surface of a sphere having a radius substantially greater than the length of the generating line of the initial cone.

It is desirable from the point of the viewer of the picture that the glass viewing screen be as nearly flat as possible so that if he should observe the screen from a distance at an angle from the screen, all portions of the image will strike his eye at the same angle. This condition must be balanced against the structural requirements of the tube. A completely flat glass viewing screen will not withstand the external atmospheric pressure due to the high internal vacuum without rupturing due to tensile stresses unless it is made excessively thick, whereas a slightly curved glass viewing screen can be put under precompression by the metal envelope which will enable it to withstand atmospheric pressure without serious tensile stresses.

A compromise is arrived at which at present is somewhere between 25 and 40 inches spherical radius. For this reason it is necessary that the inner boundary of the viewing screen seating surface describe a portion of the surface of a sphere, as above identified, and that the initial true cone must be so made that when it is reformed to the rectangularized shape the inner boundary of the face plate seating surface will assume the desired spherical form. In addition to the simplicity of operation which is achieved by first forming a true cone and then rectangularizing it, there are several additional reasons for following this novel procedure.

A heavy gauge lip is required to seal the face plate; a heavy gauge surface is required to seal the neck; whereas a considerably lighter gauge can be allowed in the body of the cone which connects these two surfaces since this has no other utility than to preserve the high vacuum of the tube. In view of the great cost of the raw material, it would not be possible to compete if the light gauge body were required to be made of heavier gauge for manufacturing reasons only. The present technique of spinning provides these exact standards and is the only known process whereby this great saving in metal can be achieved. Patent No. 1,939,356 shows a method which can be used to obtain a suitable predetermined wall thickness in spinning a cone from a blank, the wall thickness being a function of the sine of the angle of the wall to the axis of spin.

In the process of forming the novel rectangular metallic television body of the present invention, a disc having an initial thickness equal substantially to the thickness of the reinforcing elements of the final tube body is first used. This disc is preferably not truly circular but has a slightly ovoid shape in order to save metal and to avoid excessive trim. The nature of this ovoid shape will be subsequently described.

The disc is then reformed into substantially a pan shape with a pan wall having a slant height sufficient to contain the ultimate reinforced area of the finished tube body. This pan wall is bent up with respect to the body of the disc or pan bottom at an angle substantially equal to the angle selected for spinning.

Thereafter the pan is spun into a true frustro-conical form. The spinning operation commences at a radius slightly greater than the radius of the glass neck of the electron gun which is to be sealed to the final cone and continues substantially up to the bend of the previously described pan wall. Thus, the spinning operation thins the main wall of the cone while leaving the base at the original thickness and providing an annular flange of the original thickness at the larger end.

The reinforced frustro-conical shape may alternately be formed by the process described in the above-mentioned Patent No. 2,603,177.

Thereafter the cone is placed in a die which rectangularizes the same while at the same time it forms the outer annulus into a reinforced seat for the viewing screen, the inner boundary of the seat describing a portion of the surface of a sphere as above set forth.

The base is then cut out circularly by an appropriate tool to provide an entry for the electron beam while leaving an annular flange of original thickness to which the glass envelope of the electron gun may be sealed.

Unneeded portions of the reinforcing lip for the viewing screen seat may then be trimmed off to obtain uniformity of lip height. Where, however, the original disc is shaped to the proper ovoid form as above-mentioned, the amount of this final trim may be greatly reduced thereby resulting in a substantial saving of metal.

Thus, another corollary object of the present invention is the provision of a novel process for the rectangularizing of a reinforced lip cone in order to provide an appropriate spherical seating surface at one end and an appropriate plane seating surface at the other end.

The foregoing and many other objects of the invention will become apparent in the following description and drawings in which:

Figure 1 is a view in perspective of the novel metallic television tube body.

Figure 2 is a cross-sectional view taken on line 2—2 of Figure 1 looking in the direction of the arrows.

Figure 3 is a cross-sectional view taken on line 3—3 of Figure 1 looking in the direction of the arrows.

Figure 4A is an enlarged fragmentary vertical cross-section of the wall of the tube body.

Figure 11:
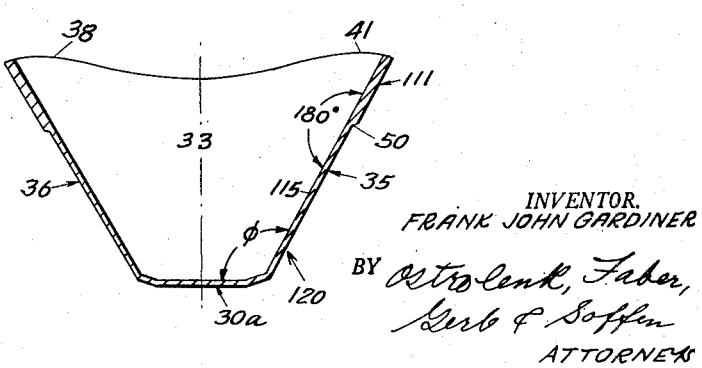
Figure 11 is a schematic view showing the pan shape member formed by the die of Figure 10 spun into a true frustro-conical cone having a base of original thickness and an annular reinforcing outer lip of original thickness.
Figure 12:
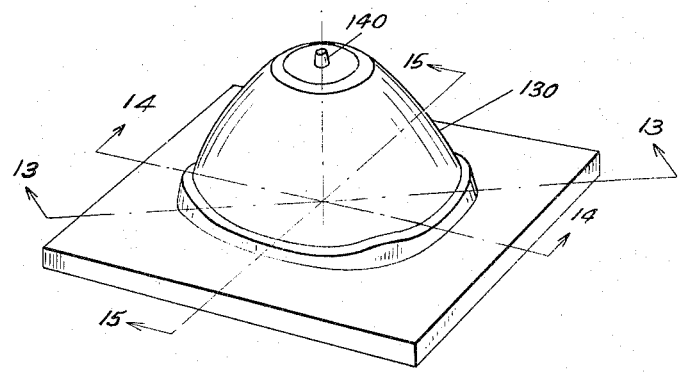
Figure 12 is a view in perspective of the punch utilized to rectangularize the cone of Figure 11.
Figure 13:
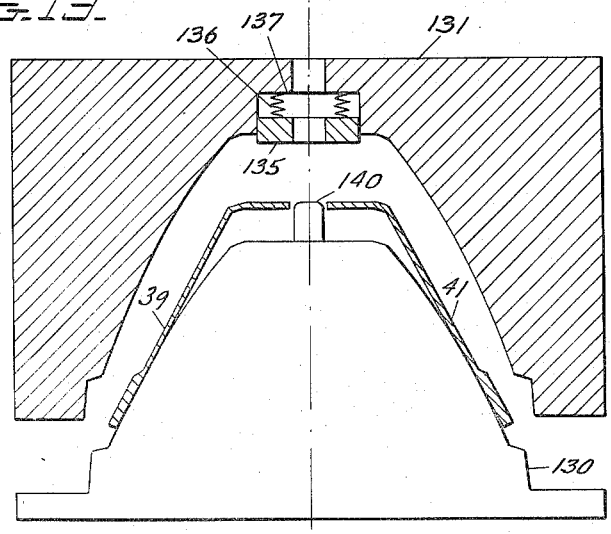

Figure 13 is a cross-sectional view taken on the diagonal 13—13 of Figure 12 looking in the direction of the arrows and showing the manner in which the spun cone of Figure 11 is seated on the punch of Figure 12 preliminary to formation into the rectangularized form. It will here be noted that the corners of the punch which will form the corners of the rectangularized cone support the initial cone substantially above the level of the punch.

Figure 14:
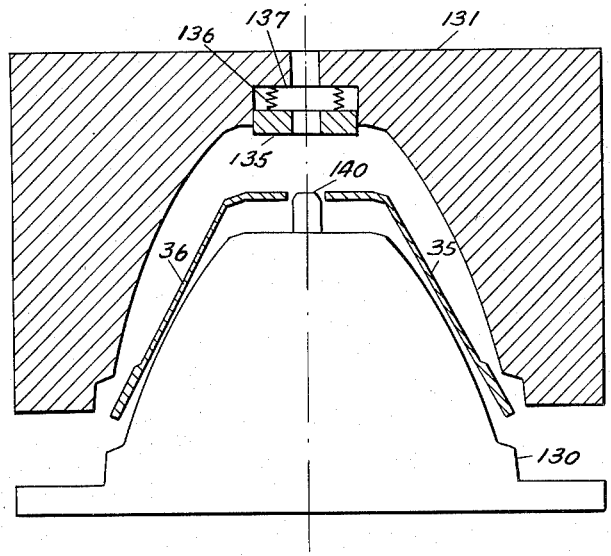

Figure 14 is a cross-sectional view taken on line 14—14 of Figure 12 showing the manner in which the portions of the spun cone of Figure 11 which are to form the narrow sides of the tube are related to the punch.

Figure 15:
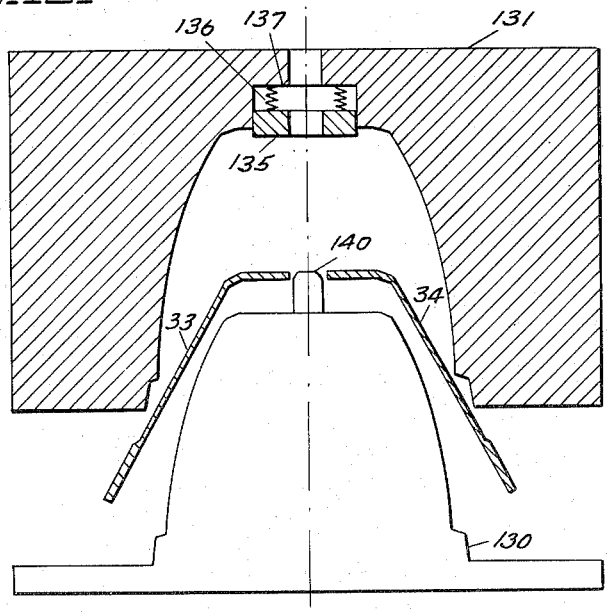

Figure 15 is a view corresponding to Figure 14 taken on line 15—15 of Figure 12 showing the manner in which the portions of the spun cone which are to form the wide sides of the television tube body are related to the punch.

Figure 16:
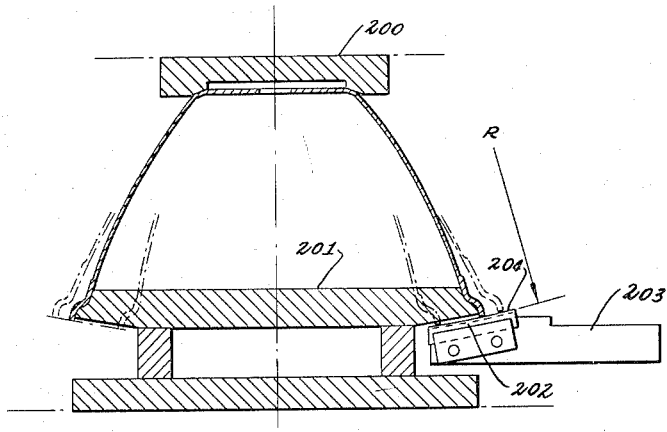

Figure 16 illustrates schematically the next stage in the operation wherein the finished rectangularized cone of Figure 15 is trimmed by a special tool and polished so that the top edge of the reinforcing lip around the seat for the viewing screen itself will describe a curve lying on a spherical surface of the same radius as that of the inner boundary of the viewing screen seat but on a center displaced from that of the viewing screen seat by an amount equal to the desired height of the lip above the inner boundary of the viewing screen seat.

Figure 17:
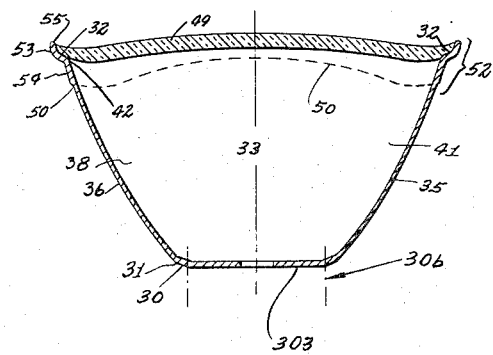

Figure 17 is a schematic view showing the rectangularized cone as formed by the processes of Figures 8 to 16 and illustrates the final operation of cutting out the base.

Referring first to Figures 1 to 4, there is here shown the novel metallic television tube body of the present invention having a truly circular reinforcing ledge 30 at one end, said ledge extending substantially in a plane normal to the longitudinal axis of the television tube body and a substantially rectangular reinforced seat or ledge 32 at the other and wider end.

The rectangularized television tube body has a continuous peripheral wall which for purposes of convenience is divided into the long side walls 33 and 34, the short side walls 35 and 36, and the corner areas 38, 39, 40 and 41. The corner areas 38 to 41 at the seat are curved in plan view on a radius substantially equal to .25 the width of either side wall 35, 36.

As previously mentioned and will hereafter be pointed out in detail, the walls 33 to 36 and their connecting corner areas 38 to 41 are thinned by spinning the entire television tube body from an initially flat disc, this flat disc having an initial thickness substantially equal to the thickness desired for the reinforced areas of the tube body. In the spinning operation, the spinning itself is commenced at a predetermined distance from the center of the flat disc thereby making provision for the reinforcing annulus 30, which extends in the initial plane of the flat disc and, therefore, in a plane normal to the axis of the final tube body.

The spinning operation thins and extends the walls and corner areas 33 to 41; but this spinning operation is terminated in the region 50 so that the original thickness of the flat disc now remains at the outer and wider end of the cone.

This original reinforcing thickness 52 is then formed into the seat 32 for the viewing screen and the retaining lip 53. The seat 32 is formed in the reinforced outer area 52 in such manner that a portion 54 of the thickened area 52 extends below the seat 32.

The reinforcing lip 53 cooperates with the seat 32 to retain the viewing screen 49 in place and to provide a support therefor. The reinforcing section 54 below the seat 32 rigidifies the seat 32 and prevents any bending moment, owing to the lateral compression of the glass of the viewing screen 49 from deforming the seat 32 and the reinforcing lip 53 and thereby breaking the glass.

While in the initial circular cone formation (from which the rectangularized tube body of Figures 1 to 4 is made) the boundary 50 between the reinforced areas and the thinned or spun area of the tube body occupies a circle in a plane normal to the axis in the final rectangularized form, the said boundary 50 between the reinforced area and the thinned or spun area of the wall extends approximately in the surface of a sphere.

The position of boundary 50 in the finished rectangularized tube body is predetermined by the position of this boundary in the initial circular cone. The rectangularizing of the cone reshapes the boundary 50 so that it occupies approximately the surface of a sphere having the same location with respect to the outer boundary 31 of seating surface 30 as the generating point of the initial cone.

While the surface is, for all practical purposes, spherical, it is actually a complex geometrical surface which is not precisely spherical except in the limiting case where outer boundary 31 of seating surface 30 is reduced in diameter to one point where it coincides with the generating point. The course of boundary 50 may be predetermined by describing a line which is the locus of points equally remote from the line 31.

In the rectangularized tube body in Figures 1 to 4, the inner boundary 42 of the seating surface 32 for the viewing screen 49 extends in the surface of a sphere. This spherical surface in contradistinction to the spherical surface for boundary 50 is not predetermined by the conformation of the initial circular cone but is arbitrarily chosen to have the same radius on the inner surface of the viewing screen 49. The relationships between these spherical surfaces and the geometry and basic conformation of the rectangularized tube will hereinafter be pointed out in connection with Figure 7.

It is here sufficient to point out that in translating or reforming a spun circular cone into a rectangularized body having its large end substantially rectangular and its small end substantially circular, reformation of the wall structure must occur. Also, the reforming of the circular cone so that its small end extends in a plane while its large end extends in a surface of a sphere also requires reformation of the wall of the original circular cone.

It is well-known that when a flat metallic sheet or any membrane is supported at its edges and loaded on its surface, large deflections occur. When, however, this sheet or membrane is initially curved and loaded on its convex side the deflections due to a similar load are relatively minute. Also, if this sheet or membrane be loaded on its concave side, the corresponding deflections are relatively smaller than those evidenced by the flat sheet or membrane. Large deflections on the cone body 33 to 41 must necessarily result in small but dangerous deflections, rotations and stress in the glass-metal seal area 32, resulting in fracture of the glass. In addition, the electron gun 60 shown schematically in Figure 2 emits electrons to the screen bounded by the lip 32; in order not to obstruct this emission, no portion of the cone must infringe on this beam path. Thus, the necessity for avoiding deflections of the walls 33–41 under atmospheric pressure and high vacuum loads requires the avoidance of flat areas in this body; the further requirement of a clear electron path rules out the use of concave surfaces thus making uniform and varying convexity of the wall of the tube body essential.

Figure 4:
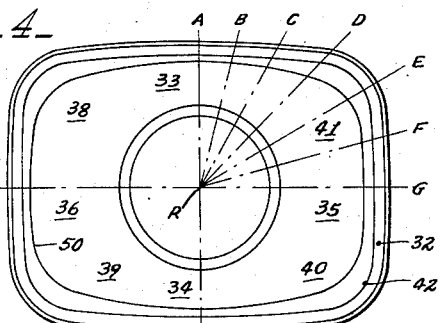
Figure 4 is a top plan view of the television tube body of Figure 1.
Figure 5:
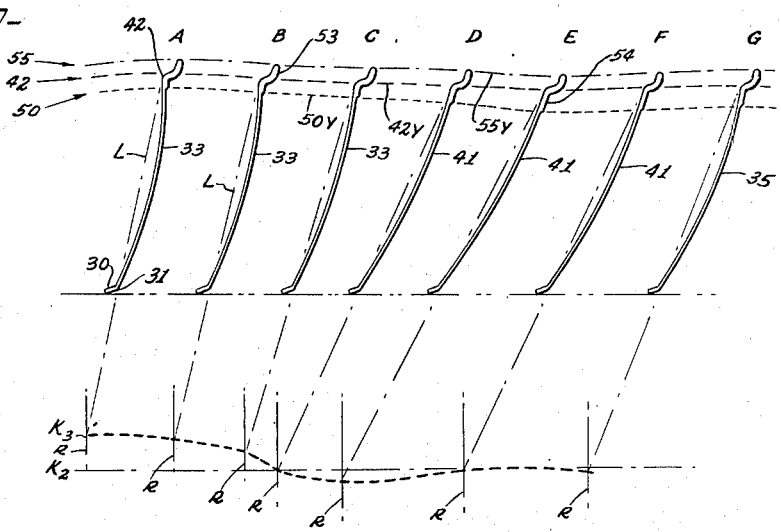
Figure 5 is a series of cross-sectional views arranged in graphic form taken respectively on line A—B—C—D—E—F and G of Figure 4.

The conformation of wall area 33 to 41 is clearly shown in the graphically arranged series of cross-sectional views of Figure 5.

It should here be pointed out that the degree of spherical curvature of the inner boundary 42 of the rectangular seating surface 32 of the tube is determined by the tensile strength of the transparent material to be used as the viewing screen 49 and the optimum radius of curvature to be utilized for material of that tensile strength.

As previously pointed out, a flat viewing screen would provide the best optical results. However, since viewing screens are usually made of glass and since the diagonal of the viewing screen is on the order of 16" and more, it has been found that the viewing screen must be made spherical on a radius of curvature somewhere between 25" and 40" (depending on the material used) in order to provide an arch construction adapted to resist the tensile strains imposed by the virtually complete evacuation of the interior of the tube body.

Since the strains in the viewing screen are not only transmitted downwardly onto the seat 32 but are also distributed laterally against the lip 53, the lip 53 must be sufficiently strong so that it will not bend or yield resiliently or otherwise under the strain. For this reason, the lip 53 is thickened or rather by the process of manufacture is left with the original thickness of the disc from which the wall is spun. Also, since a bending moment applied from below the seat 32 would tend to break the seal between the viewing screen and the tube body at the seat 32 and reinforcing lip 53, the section of the tube 54 below the seat 32 must be reinforced to prevent this bending moment from causing excessive strains in the glass-metal seal area.

For this reason in a tube having a rectangularized surface with a 16" diagonal at the viewing screen and having an axial length of approximately 8½" between the base and the viewing screen, the minimum extension of the reinforcing annular area 54 below the seat 32 should be ½" and the minimum width for lip 53 should be of the order of ½" with the reinforced area having a thickness of the order of .1". These figures hold for raw material having the composition of high chrome steel and for a spun wall thickness of .05".

Since the rectangularization of the original cone produces a curvature of the boundary 50 between the reinforced or original thickness section 52 and the thinned or spun wall on a shorter radius than the radius of spherical curvature of the inner boundary 42 of seat 32, the actual width of reinforcement 54 varies from the minimum requirement of ½" along line A (Figure 5) which intersects the center of the long wall 33 of the tube to approximately 1" along line E which intersects the center of the short wall 35 of the tube. This variation is indicated along curve 50y of Figure 5.

Figure 7:
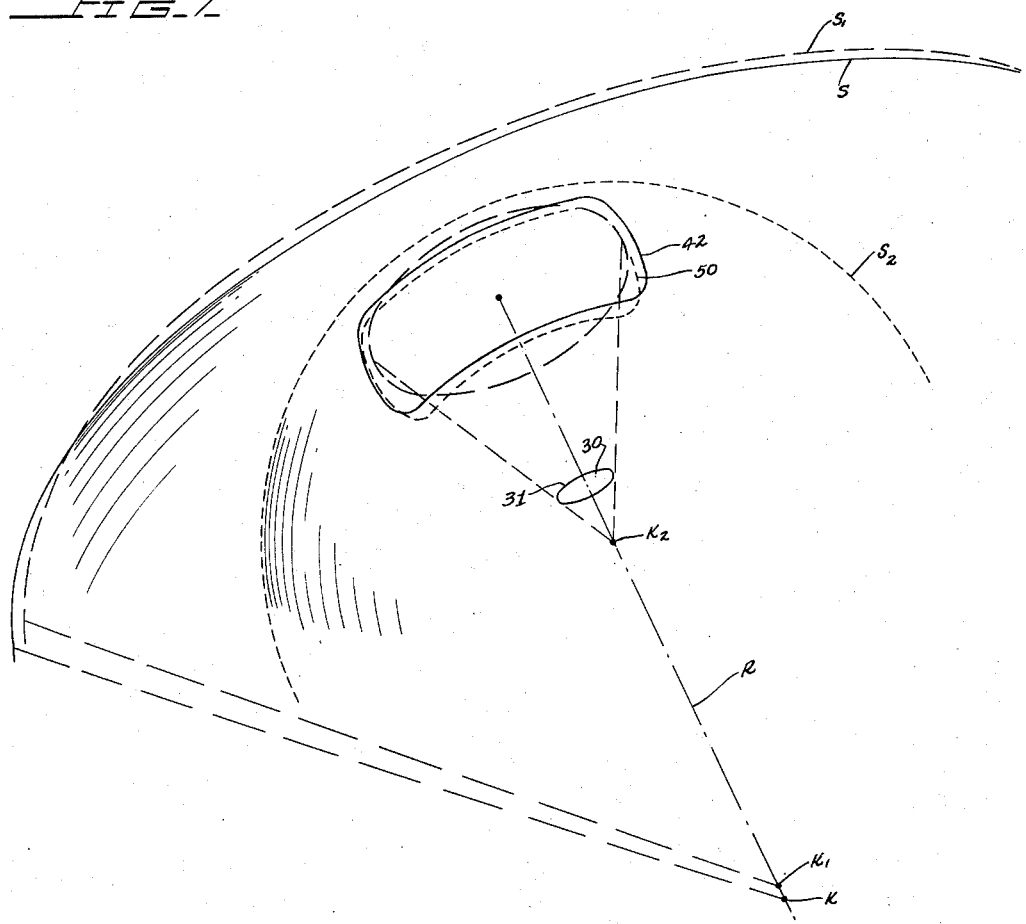
Figure 7 is another schematic view illustrating further some of the characteristics of the television tube body.

The geometry of the conformation of the tube body itself is demonstrated schematically in Figure 7. Initially it should be borne in mind that the inner edge 42 of the seating surface 32 is formed by the interesection of the surface of a sphere S of selected radius with a rectangularized cone, said cone in its original circular form being generated from a generating point $K_2$ which lies on the radius R of the sphere S constituting the axis of the rectangularized cone and the axis of the original cone and which lies between the surface of the sphere S and its center K.

Figure 6:
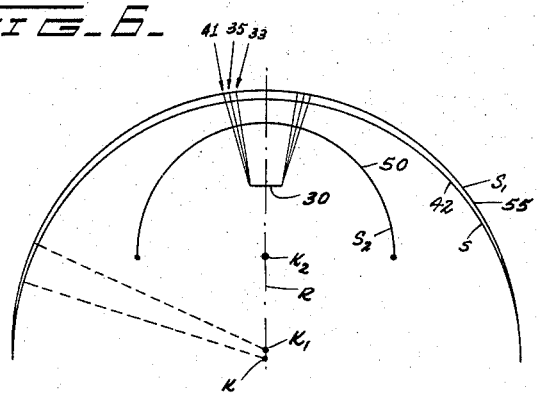
Figure 6 is a schematic view demonstrating some of the characteristics of the television tube body.

These relationships may be more readily seen from a comparison of Figures 5, 6 and 7.

The initial cone has the generating point $K_2$; its wall is generated at an angle which will produce an outer or wide opening at the large end having a diameter greater than the distance between the two long sides and less than the distance between the two short sides. The original cone (see also Figure 11) with its reinforcement 111 (which is intended to form the reinforced area 52 of Figure 2) is so dimensioned that the circular boundary 50 between wall 115 and reinforcement 111 will equal the perimeter of boundary 50 in the finished tube body of Figure 2. It will be noted, incidentally, that the upper boundary of the cone of Figure 11 although circular in cross-section is undulated so that the cone which is rectangularized will receive minimum trimming.

Thus, in Figure 7 it will be seen that the original cone is generated at point $K_2$ on radius R at an angle to satisfy the conditions hereinabove noted. When the cone is rectangularized, the outer boundary 31 of lower reinforcement 30 remains circular but the boundary 42 of seat 32 is rectangularized. Sphere S on center K intersects the cone to define the boundary 42 so that boundary 42 extends in the surface of sphere S. The upper edge 55 of lip 53 is trimmed on sphere $S_1$, having center $K_1$ displaced upwardly from center K by the desired height of lip 53. While sphere $S_1$ is here used and referred to, actually $S_1$ should be more nearly an oblate spheroid, the minor axis of which coincides with that of the original cone; the diameter of the minor axis equals that of sphere $S_1$; the diameter of the major axis is that of sphere S plus twice the width of ledge 32; and the center of the spheroid is displaced upwardly by a distance equal to the desired height of lip 53.

For practical purposes, where the curvature of sphere S is on a large radius such as 30", sphere $S_1$ may be a true sphere since the variation may not be significant. For a sphere S of smaller radius it may be necessary to make sphere $S_2$ oblate in accordance with the above conditions. By way of example, in a tube having a 16" diagonal, the axial distance $K_2$ (imaginary in the final tube body) to the screen 49 may be 15"; the axial distance K to the screen 49 may be 30", the vertical distance from the plane of lower reinforcement 30 to screen 49 may be 8½", and the average vertical displacement of the upper edge 55 of lip 53 above the boundary 42 may be about ½". The greater the distance K to screen 49, the flatter the spherical surface of 49 and boundary 42. The outer limit for this distance is the structural strength of the glass screen 49 and the inner limit is the maximum curvature permissible for screen 49. Thus, for a tube of the size taken in the example and with present known materials for screen 49, the maximum limit is about 40" and the minimum desired limit is of the order of 25". These limits may be spread; the outer limit may be increased even to infinity as stronger screen materials are discovered; the inner limit may be decreased for those applications where a wide angle of view may happen to be unnecessary.

It will be noted that when the cone is rectangularized the boundary 50 will fall into the surface of sphere $S_2$ having point $K_2$ as a center.

All of these relationships are especially clear from a comparison of Figures 6 and 7. Figure 5 graphically illustrates these relationships in a quadrant of the television tube body where the variations in vertical height of boundary 42 above the plane of reinforcement 30 are illustrated along the curve $42y$; the variations in the height of boundary 50 are illustrated along curve $50y$ and the relationship of upper edge 55 of lip 53 to boundary 42 is illustrated along curve $55y$. It will be seen that the formation of boundary 50 to lie in the surface of a sphere $S_2$ of about half the radius of the sphere S in which boundary 42 lies causes a variation in the height of reinforcement 54 at the corners which are more remote from the line R.

Also $K_3$ (the point of intersection of a line drawn along the slant height L of the tube body and the radius R) varies above and below $K_2$, the generating point of the original cone, but is in the general region of point $K_2$.

The slant height here taken is a line L connecting boundary 42 of seat 32 and outer boundary 31 of reinforcement 30. This outer boundary 31 was present in the same dimension in the original cone.

It will be noted from a comparison of line L of Figure 5 with the side walls of the tube that these walls are convex in order better to withstand external atmospheric pressure. This convexity makes it possible to use a thinner wall and results in a saving in metal.

If desired, the corner areas, 38 to 41, may be substantially straight along a line running from boundaries 50 to 31 while, however, the walls 33 to 36 are convex on a compound curve for resistance to the stress of atmospheric pressure.

The original cone from which the tube body is formed may be defined from the finished tube as the boundary 50 reformed into a circle of the same perimeter and at a slant height substantially equal to the average slant height from circle 31 which defines the outer boundary of reinforcement 30. The angle $\phi$ of Figures 10 and 11 can thus be determined from the finished tube body.

Figure 8:
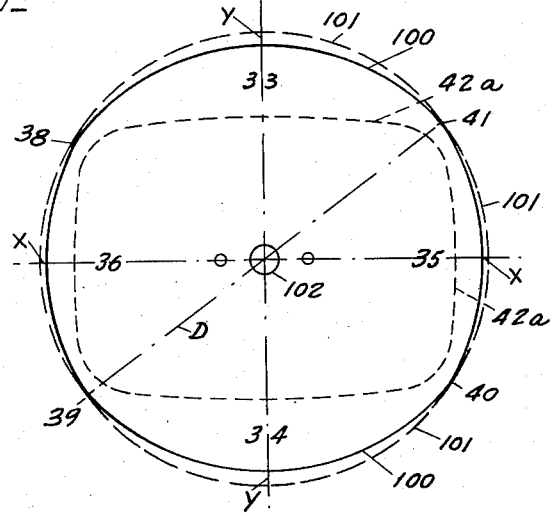
Figure 8 is a plan view of a disc which is used in the manufacture of the novel television tube body.

In Figures 8 to 17 there is shown the method by which the novel television tube body is made. The disc 100 which is to form the television tube body is shown in Figure 8. There has been superimposed in dashed lines on Figure 8 the outline $42a$ of the inner boundary 42 of the glass screen seating surface 32 of Figures 1 to 6 illustrating the general relationship between the somewhat ovoid disc 100 and the ultimate television tube body which is to be formed therefrom.

The formation of the disc 100 in the circular form shown by dashed lines 101 would produce an ultimate tube body which would require substantial trimming and substantial waste of material in order to have lip 53 of regular height along the finished tube body. To reduce this substantial waste and time, disc 100 is shaped as shown into an ovoid form wherein the sections of the disc 100 which will form the corner areas 38 to 41 contact the circular line 101, while the sections of the disc which are to form the side walls 33 to 36 extend inwardly of the full circle 101 to produce the ovoid form.

By proper dimensioning, a disc 100 may be utilized which, after all of the operations are completed, will produce a final television tube body requiring only the trim (to produce proper lip height 53) necessary to remove the small excess of metal provided as an allowance for the normal variation in the forming characteristics of the sheet metal used in the process. The blank 100 necessarily must be cut from rectangular sections of the original sheet metal, the corners being waste.

If a circular disc (as 101) were used, the rectangle would necessarily be a square having an altitude and base equal to the diameter of the circle. By making the disc 100 ovoid in shape, the altitude of the rectangle is reduced by $2y$ where $y$ (Figure 8) is the maximum amount of flattening of each of two opposite sides of the ovoid shape from the circular shape, and the base of the rectangle is reduced by $2x$ where $x$ (Figure 8) is the maximum amount of flattening of each of the other two opposite ends of the ovoid shape. Thus, the saving in metal area in the rectangular panel from which the ovoid blank 100 is formed as against the rectangular panel required for a circular blank is $2L(x+y)-4xy$, where L is the length of a side of the square required to circumscribe circle 101 and equals the major diagonal axis D of the ovoid 100 as well as the diameter of circle 101.

By the use of the ovoid shape, D, therefore, lies along the diagonal of the rectangular panel rather than being perpendicular to the sides. The saving is thus much larger than the four crescents saved by the ovoid over the circular form. Thus, in an ovoid disc 100 having a diagonal D of 18", the dimension $y$ is $3/32$" and the dimension $x$ is $15/32$". The saving in metal for the rectangular blank to form ovoid 100 over the blank for forming circle 101, therefore, is 6.18%.

Figure 9:
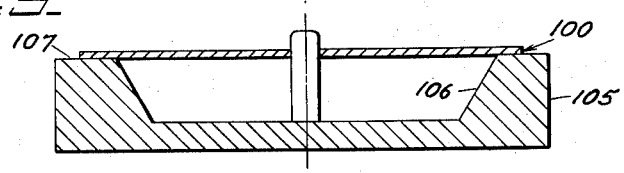
Figure 9 is a cross-sectional schematic view showing the thickness of the disc of Figure 8 and showing how the disc in Figure 8 is positioned in a die to form the pan shape preliminary to spinning.

The disc is provided with one or more centrally located openings 102 in order to facilitate handling, that is, in order to facilitate the spinning operation hereinafter described and in order to facilitate the positioning of the unit with respect to the punch and die hereinafter described. The disc 100 is, as shown in Figure 9, placed in a frustro-conical die 105 having the inclined circular wall 106 and the supporting edge 107. The blank holding ring 109 is then brought down to engage the disc 100. The punch 108 (Figure 10) shaped to match the die 105 of Figure 9 then is brought down to form the disc 100 into the pan shaped structure 110 of Figure 10 drawing the lip 111 through the annular slot between ring 109 and seat 107. The original thickness of the disc 100 has been retained in the area 111 which is eventually to form the reinforcing area 52; but the draw through the annular slot between ring 109 and seat 107 has increased the slant length of the material of the disc forming the lip 111 while reducing its circumferential dimension. The angle to which the area 111 is bent is approximately equal to the angle $\phi$ which the wall 115 of the cone of Figure 11 will make with the reinforcing area 30a at the bottom of the cone.

Figure 10:
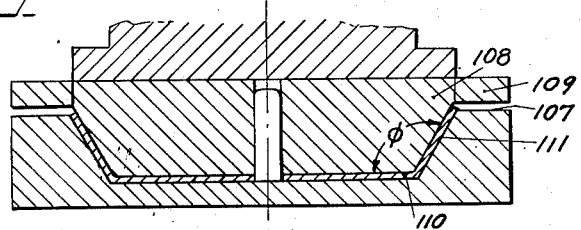
Figure 10 is a schematic view showing the method by which the die operates to form the pan shape preliminary to spinning.

After the pan-shaped structure of Figure 10 is achieved, the pan-shaped disc 110 is spun, retaining however the circular area 30a at the center and spinning the wall 115 to a thickness which is related to the original thickness as sin $(\measuredangle \phi-90°)$T; where T is the original thickness; this spin terminates at reinforcing area 111. The spinning operation extends the wall 115 of the cone at an angle $\phi$ to the base 30a approximately equal to the original angle $\phi$ between the lip and the base of pan 110. Since the spinning operation is halted at the boundary 50 between the base of the original pan 110 and the bent up area 111, the angle $\phi$ between the bent up area 111 and the remainder of the pan is thereby changed to approximately 180° and the area 111 becomes a thickened extension of the thinned wall 115. As seen in Figure 11, the original ovoid shape of member 100 causes the boundary of the outer opening of the cone to describe an undulating line as the slant height of the cone varies in accordance with the limits imposed by the original ovoid shape. The same cone 120 and its reinforced area 111 may be spun directly from the ovoid disc 100 without the intervention of the steps of Figures 9 and 10 by application of the technique of application Serial No. 154,140.

It is now necessary to reform the cone of Figure 11 so that the upper and wider end thereof is rectangularized to the form shown in Figures 1 to 5 while at the same time the reinforcing element 54, seat 32 and retaining lip 53 are formed. Also this must be done in such manner that the inner boundary 42 of seat 32 and its associated elements will reach the spherically curved form described in connection with Figures 1 to 7.

For this purpose the punch and die assembly shown in Figures 12 to 15 are used. The punch 130 has the conformation of the desired interior of the formed television tube body of Figures 1 to 5. Consequently the elements thereof have been given the same reference numbers as the television tube body of these figures. The die 131 has an internal conformation corresponding to the exterior conformation of the television tube body of Figures 1 to 5 and consequently the elements thereof have been given the same reference numbers. Die 131 has a knock out pad 135 substantially equal in diameter to the base 30a of the cone. The knock out pad 135 is supported by compression springs 136 in the cylindrical counterbore 137 so that the pad 135 may enter the counterbore 137 during the forming operation. The springs 136 by pushing out the pad 135 after the forming operation knock the formed television tube body out of the die.

The illustration of the punch and die operation for forming the cone of Figure 11 into the television tube body of Figures 1 to 5 and 17 is important not so much for the process which it shows although that is valuable but primarily because it contributes further to an understanding of the conformation of the formed television tube body and the relationship of the formed television tube body to the spun cone from which the final structure is made.

From this point of view it will be noted that the cross-sectional view of Figure 13 is taken on a diagonal of the punch and hence through a pair of diagonally opposite corners of the punch and, therefore, of the television tube body to be formed thereby. When the spun cone 120 of Figure 11 is placed over the punch 130 with the opening 102 seated over the positioning pin 140, the engagement of the cone with the corner sections 38 to 41 of the punch holds the cone up substantially above the level of the punch 130.

An examination of the corresponding cross-sectional views of Figures 14 and 15 which show, respectively, the narrow side walls and the wide side walls illustrates how such portions of the cone 120 of Figure 11 as are to form these side walls are held away from the punch 130 by the corner areas of the punch. Thus, it may be seen that as the die 131 moves down on the punch 130, the portions of the cone 120 which are to form the corner areas 38 to 41 are deformed to the greatest extent since the process of deformation begins at the moment the punch and die engage and continues until the conclusion of the forming operation.

The portions of the center of the long side walls are deformed the least from the original conical conformation since they are subjected to movement in response to the interengagement of punch and die for the shortest period of time and only during the latter portion of the engagement. Actually the narrow side wall sections must be pushed out while the wide side wall sections must be pulled in.

However, the conformation of the corner sections serves to hold the side wall sections in against the punch so that the punch does most of the work on the corner sections, the conformation of which in turn assists the punch and die in shaping the other sections. At the end of the stroke of the punch and die, the thickened area 111 of the cone is shaped into the reinforced seat 32 of Figure 2, the associated retaining lip 53 and reinforcement 54. These are shaped by the punch and die in such fashion that the inner boundary 42 of seat 32 lies on the spherical curvature previously described.

Subsequently, the portion of lip 53 which projects beyond the television tube body for more than is necessary to obtain the retaining action required is trimmed off so that preferably the retaining lip 53 is regular in dimension about the seat 32. The cone formed from the disc is placed on the punch so that the areas 38 to 41 thereof identified with those areas in the original blank register with the corner areas 38 to 41 of the punch 130 of Figure 12.

After the rectangularization and prior to the heat sealing of the glass face in the tube body, a uniform heat treatment of the tube body is necessary to release the stresses locked in the metal by the forming operations. Otherwise, the non-uniform heating associated with the sealing operation will cause the rectangularized cone to change its shape irregularity during sealing. In particular, the long sides of the rectangularized tube body will tend in the absence of prior heat treatment to bow outwardly during sealing.

After the tube body is formed by the punch and die of Figures 12 to 15, the lip 53 is trimmed to the proper height so that its edge lies in the surface of sphere S' of Figures 6 and 7, the center of sphere S' being displaced upwardly from the center of sphere S (which defines boundary 42) by an amount sufficient to produce the desired height for lip 53. I have found that this result may be achieved by the novel method wherein the formed cone is positioned by a pad 200 against a rotatable member 201 shaped to conform to the sealing surface 32 and its inner boundary 42. An abrading or cutting tool 202 is mounted on tool holder 203 movable parallel to the axis of the tube body. The tool 202 has an operating surface 204 with a spherical curvature equal to the desired spherical curvature S' of the outer end of retaining lip 53. By rotation of member 201 and of the tube body mounted thereon, the end 55 of lip 53 will be given a smooth surface along the spherical curvature S' as the tool holder 203 is moved axially. Pad 200 is provided for the purpose of applying desired clamping pressure.

It should be noted that during the rotation of the tube body the edge 55 of lip 53 is continuously in motion along the operating surface or face 204 of tool 202 between the extreme positions indicated by the dotted lines of Figure 16.

Thus, a fresh cutting or abrading surface is continuously being presented by the tool to the work surface. This permits an extremely high rate of metal removal without damage to the tool or the work.

The base 30 of the rectangularized tube body is cut along the circular line 30b, preferably by a conventional punching operation to remove the section 30a, thereby leaving the electron gun sealing annulus 30 and providing the necessary aperture to permit full deflection of the electron beam.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. The method of forming a frustro-pyramidal tubular body having a reinforced base opening and a reinforced opposite substantially rectangular opening comprising the steps of drawing a flat plate into a cup shape wherein a base supports inclined walls at the annular marginal area of a plate; spinning the cup to a frustro-conical form by commencing the spin at a point radially displaced from the center of the base and halting the spin at the bent up annular marginal area; thereby creating an extension of the original inclined wall having a thickness different from the wall and retaining the original thickness of the plate at the base and at the bent up marginal area and reducing the thickness of the wall between; stamping the frustro-conical form to a frustro-pyramidal form with the opening substantially rectangularized and bending the annular marginal area into an angular cross-section.

2. The method of forming a frustro-pyramidal tubular body having a reinforced base opening and a reinforced opposite substantially rectangular opening comprising the steps of drawing a flat plate into a cup shape, wherein a base supports inclined walls at the annular marginal area of a plate; spinning the cup to a frustro-conical form by commencing the spin at a point radially displaced from the center of the base and halting the spin at the bent up annular marginal area; thereby creating an extension of the original inclined wall having a thickness different from the wall and retaining the original thickness of the plate at the base and at the bent up marginal area and reducing the thickness of the wall between; stamping the frusto-conical form to a frustro-pyramidal form with the opening substantially rectangularized and bending the annular marginal area into an angular cross-section and trimming the outer edge of the annular marginal area so that said edge lies in the surface of a sphere.

3. The method of forming a frustro-pyramidal tubular body having a reinforced base opening and a reinforced rectangular opening at the opposite end comprising the steps of drawing a flat plate into a cup shape wherein the walls are inclined with respect to a base; spinning the cup to a frustro-conical form by commencing the spinning at a point removed radially from the center of the base and continuing the spinning for the entire remaining portion of the base thereby creating an extension of the original inclined walls in which the extension has a thickness less than the original inclined wall and the inclined wall and new base have a thickness of the original plate; stamping the frustro-conical form into a frustro-pyramidal form to thereby form a portion of the inclined wall into a substantially rectangularized opening in which the annular marginal area has an angular cross-section.

4. The method of forming a frustro-pyramidal tubular body having a reinforced section at both ends comprising the steps of drawing a flat metal plate into a cup shape in which the base supports inclined walls; spinning the cup into a frustro-conical form by commencing the spinning at a point radially displaced from the center of the base and continuing only for the remaining portion of the base thereby constituting a continuation of the original inclined wall in which the continuation has a reduced thickness and both the original inclined wall and new base retain the original thickness of the plate; stamping the frustro-conical form into a frustro-pyramidal form in which a portion of the inclined wall is formed into a substantially rectangularized opening and bending the annular marginal area into an angular cross-section.

References Cited in the file of this patent

UNITED STATES PATENTS

| | | |
|---|---|---|
| 1,265,954 | Pribil | May 14, 1918 |
| 1,623,059 | Lammine | Apr. 5, 1927 |
| 1,919,287 | Auble | July 25, 1933 |
| 1,939,356 | Lindgren | Dec. 12, 1933 |
| 2,086,488 | Batie | July 6, 1937 |
| 2,180,992 | Meyers | Nov. 21, 1939 |
| 2,232,098 | Deichman | Feb. 18, 1941 |
| 2,363,050 | Dewey | Nov. 21, 1944 |
| 2,522,257 | Curtis | Sept. 12, 1950 |
| 2,603,177 | Gardiner | July 15, 1952 |